(12) United States Patent
Thiebaud et al.

(10) Patent No.: US 10,257,491 B2
(45) Date of Patent: Apr. 9, 2019

(54) METHOD FOR ADAPTING A NUMBER OF VIEWS DELIVERED BY AN AUTO-STEREOSCOPIC DISPLAY DEVICE, AND CORRESPONDING COMPUTER PROGRAM PRODUCT AND ELECTRONIC DEVICE

(71) Applicant: THOMSON LICENSING, Issy les Moulineaux (FR)

(72) Inventors: Sylvain Thiebaud, Noyal sur Vilanie (FR); Cedric Thebault, Chantepie (FR); Didier Doyen, La Bouexiere (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 373 days.

(21) Appl. No.: 14/977,852

(22) Filed: Dec. 22, 2015

(65) Prior Publication Data

US 2016/0182881 A1 Jun. 23, 2016

(30) Foreign Application Priority Data

Dec. 22, 2014 (EP) .................................... 14307122

(51) Int. Cl.
*H04N 7/00* (2011.01)
*H04N 13/139* (2018.01)
*H04N 13/194* (2018.01)
*H04N 13/302* (2018.01)
*H04N 13/305* (2018.01)
*H04N 13/398* (2018.01)
*H04N 13/351* (2018.01)

(52) U.S. Cl.
CPC ......... *H04N 13/139* (2018.05); *H04N 13/194* (2018.05); *H04N 13/302* (2018.05); *H04N 13/305* (2018.05); *H04N 13/351* (2018.05); *H04N 13/398* (2018.05)

(58) Field of Classification Search
CPC ........................... H04N 13/139; H04N 13/351
USPC ............................................................ 348/43
See application file for complete search history.

(56) References Cited

U.S. PATENT DOCUMENTS

2005/0012814 A1 1/2005 Shen
2005/0259147 A1 11/2005 Nam et al.
(Continued)

FOREIGN PATENT DOCUMENTS

| EP | 0780727 | 6/1997 |
|---|---|---|
| WO | WO2013086739 | 6/2013 |
| WO | WO2013089770 | 6/2013 |

OTHER PUBLICATIONS

Boev et Al: "Comparative study of auto stereoscopic displays for mobile devices"; 2011; vol. 7881; pp. 1-12.
Search Report dated May 26, 2015.

*Primary Examiner* — Richard T Torrente (57) ABSTRACT

A method and an apparatus for adapting a number of views delivered by an auto-stereoscopic display device are presented. The method is executed by an electronic device, and it comprises: determining a number of views based on a list of number of views supported by the auto-stereoscopic display device and at least an information indicative of a computing power of a device needed to deliver content for each view; obtaining a correspondence map between sub-pixels of the auto-stereoscopic display device and the number of views; and providing content to the sub-pixels of the auto-stereoscopic display device according to the correspondence map.

15 Claims, 7 Drawing Sheets

(56) References Cited

U.S. PATENT DOCUMENTS

| | | | |
|---|---|---|---|
| 2011/0032999 A1* | 2/2011 | Chen | H04N 21/23432 375/240.26 |
| 2012/0062712 A1 | 3/2012 | Kesseler et al. | |
| 2012/0154533 A1 | 6/2012 | Shin et al. | |
| 2013/0021439 A1 | 1/2013 | Tao et al. | |
| 2014/0168390 A1 | 6/2014 | Cho et al. | |
| 2014/0226205 A1* | 8/2014 | Yanamoto | G02B 27/2214 359/466 |

* cited by examiner

METHOD FOR ADAPTING A NUMBER OF VIEWS DELIVERED BY AN AUTO-STEREOSCOPIC DISPLAY DEVICE, AND CORRESPONDING COMPUTER PROGRAM PRODUCT AND ELECTRONIC DEVICE

This application claims the benefit, under 35 U.S.C. § 119 of European Patent Application No. 14307122.3, filed Dec. 22, 2014.

TECHNICAL FIELD

The present disclosure relates to the field of multi-view auto-stereoscopic display devices.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Auto-stereoscopic display devices (either based on the use of a parallax barrier, or based on the use of a micro-lens array) enable the display of multi-view content. As mentioned in the document US 2014/0168390, when a user is positioned at an "optimal distance", He perceives only a first view from one eye, and a second view from another eye (see FIG. 5 of document US 2014/0168390, and the optimal viewing distance "OVD"). Therefore, He perceives a 3D effect, without having to wear 3D glasses (either passive or active glasses). The set of positions at an optimal viewing distance defines regions in space named sweet spots or also viewing spots, i.e. these regions located in front of auto-stereoscopic display device are regions where a user can only perceive one view per eye, enabling the viewing of a 3D content without interferences (see for example the article entitled "*Comparative study of auto stereoscopic displays for mobile devices*" by A. Boev and A. Gotchev). It should be noted that, the higher a number of views auto-stereoscopic display devices provide, the smaller the sweet spots are.

Usually, an auto-stereoscopic display device comprises:
a display panel which is an array of pixels (such display panel can be for example a TFT LCD screen (for Thin-film-transistor liquid-crystal display screen)) that can be viewed as an image forming means, and
an optical filter positioned in front of such display panel that controls the diffusion directions of rays of light emitted by the display panel. The optical filter can be either a parallax barrier (or a combination of parallax barriers, that intend to block light in some directions), or a lenticular sheet (that intends to refract the received light from pixels), or an integral lens sheet (as in document EP 0780727).

More precisely, a pixel comprises several sub-pixels as explained for example in document US 2014/0226205. As detailed in FIG. 3 of document US 2014/0226205, a pixel can be made of three sub-pixels, and each of these sub-pixels is associated with a primary color (blue, red or green) and with an image view. An example of an arrangement of these sub-pixels in a display panel is depicted in the FIG. 4 of document US 2014/0226205, in the case that three images views are delivered by the auto-stereoscopic display device (the information of such arrangement is given in a correspondence map which associated each sub-pixel of said auto-stereoscopic display device with a view). At last, when all the sub-pixels associated to one view (as in the FIG. 5 of document US 2014/0226205, with a view 1) are perceived by an eye of a viewer, an image associated with the view 1 is visualized by the viewer.

In the case that the auto-stereoscopic display device can handle n different image views, with n an integer greater or equal to two, it is possible to generate such n different images views from only two views (named stereoscopic images) as explained in the document US 2013/0050187. Usually the process of generating such n different images views can be done in a device delivering content for each view (such device is named a renderer or a device delivering content for each view). Usually such renderer is comprised in the auto-stereoscopic display device itself.

Hence, in the case that there are several auto-stereoscopic display devices to address, which supports different number of views, each auto-stereoscopic display device has a renderer for generating/providing the expected number of views associated with the concerning auto-stereoscopic display device. In order to reduce the cost of the auto-stereoscopic display devices, it could be better to suppress some electronic components in such devices as for example the renderer.

The proposed technique is directed to renderers that are not comprised in auto-stereoscopic devices.

Moreover, it is proposed a technique that is more flexible than the one in the state of the art. Indeed, for the moment, in the case that an auto-stereoscopic display device handles n different images views, with n an integer greater or equal to two, the renderer delivers n different images views. There is no flexibility in that kind of approach in the sense that the renderer only delivers a fixed number of images views. Hence, there is a need to provide a technique that provides more flexibility.

SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present principles are directed to a method for adapting a number of views delivered by an auto-stereoscopic display device. The method is executed by an electronic device, and it comprises:
determining a number of views based on a list of number of views supported by said auto-stereoscopic display device and at least an information indicative of a computing power of a device needed to deliver content for each view;
obtaining a correspondence map between sub-pixels of said auto-stereoscopic display device and said number of views; and providing content to said sub-pixels of said auto-stereoscopic display device according to said correspondence map.

In a preferred embodiment, the method is remarkable in that said determining further uses information representative of a resolution of said auto-stereoscopic display device.

In a preferred embodiment, the method is remarkable in that said determining further uses information derived from a list of frame rates supported by said auto-stereoscopic display device.

It should be noted that such list can comprise either only one element or several elements.

In a preferred embodiment, the method is remarkable in that said determining further uses information provided by a user, and/or information related to a program which is associated with said content.

In a preferred embodiment, the method is remarkable in that determining a number of views is done regularly during a time slot.

In a preferred embodiment, the method is remarkable in that said obtaining a correspondence map comprises obtaining an identifying element associated with said correspondence map.

In a preferred embodiment, the method is remarkable in that said obtaining a correspondence map comprises executing a piece of code comprising a set of features linked to said auto-stereoscopic display device.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the present principles also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the present principles is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc.

It should also be noticed that a step of obtaining an element/value in the present document can be viewed either as a step of reading such element/value in a memory unit of an electronic device or a step of receiving such element/value from another electronic device via communication means.

The present disclosure is also directed to an electronic device for adapting a number of views delivered by an auto-stereoscopic display device. The electronic device comprises:
  a first module configured to determine a number of views based on a list of number of views supported by said auto-stereoscopic display device and at least an information indicative of a computing power of a device needed to deliver content for each view;
  a second module configured to obtain a correspondence map between sub-pixels of said auto-stereoscopic display device and said number of views; and
  a third module configured to provide content to said sub-pixels of said auto-stereoscopic display device according to said correspondence map.

In a preferred embodiment, the electronic device is remarkable in that said first module configured to determine further uses information representative of a resolution of said auto-stereoscopic display device.

In a preferred embodiment, the electronic device is remarkable in that said first module configured to determine further uses information derived from a list of frame rates supported by said auto-stereoscopic display device.

In a preferred embodiment, the electronic device is remarkable in that said first module configured to determine further uses information provided by a user, and/or information related to a program which is associated with said content.

In a preferred embodiment, the electronic device is remarkable in that said first module configured to determine a number of views is activated regularly during a time slot.

In a preferred embodiment, the electronic device is remarkable in that said second module configured to obtain a correspondence map uses an identifying element associated with said correspondence map.

In a preferred embodiment, the electronic device is remarkable in that said second module is further configured to execute a piece of code comprising a set of features linked to said auto-stereoscopic display device.

BRIEF DESCRIPTION OF DRAWINGS

The above and other aspects of the present disclosure will become more apparent by the following detailed description of exemplary embodiments thereof with reference to the attached drawings in which.

DETAILED DESCRIPTION

Figure 1:
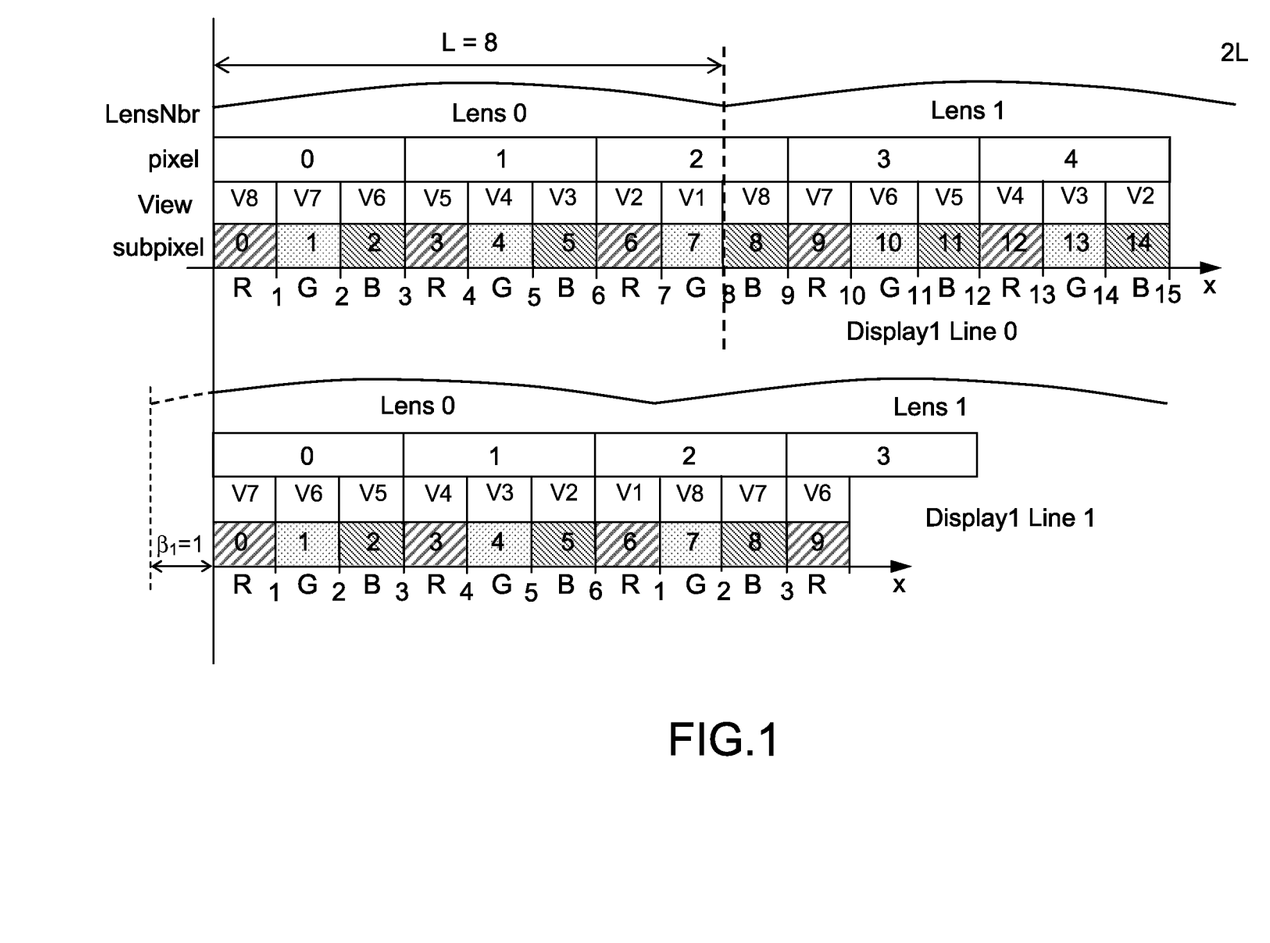
FIG. 1 presents a scheme of multi-view auto-stereoscopic display device generating 8 views.

FIG. 1 presents a simple scheme of a multi-view auto-stereoscopic display device, referenced Display1, generating 8 views.

In this example, the red (noted R) sub-pixel 0 and the blue (noted B) sub-pixel 8 generate the view referenced V8. The green (noted G) sub-pixel 1 and the red sub-pixel 9 generate the view referenced V7, . . . up to the view V1 generated by the green sub-pixel 7 and the red sub-pixel 15.

In this example, the width of the lenses L is a multiple of the sub-pixel width. The network of lenses is tilted with a slope such that the lenses of the next line are shifted from one sub-pixel ($\beta_1=1$). The relationship between a sub-pixel located at the horizontal position x, vertical position y and the view i generated by this sub-pixel can be expressed by:

Subpixel$_{x,y}$←view$_i$ with $i$=8−modulo($y+x,8$)

Figure 2:
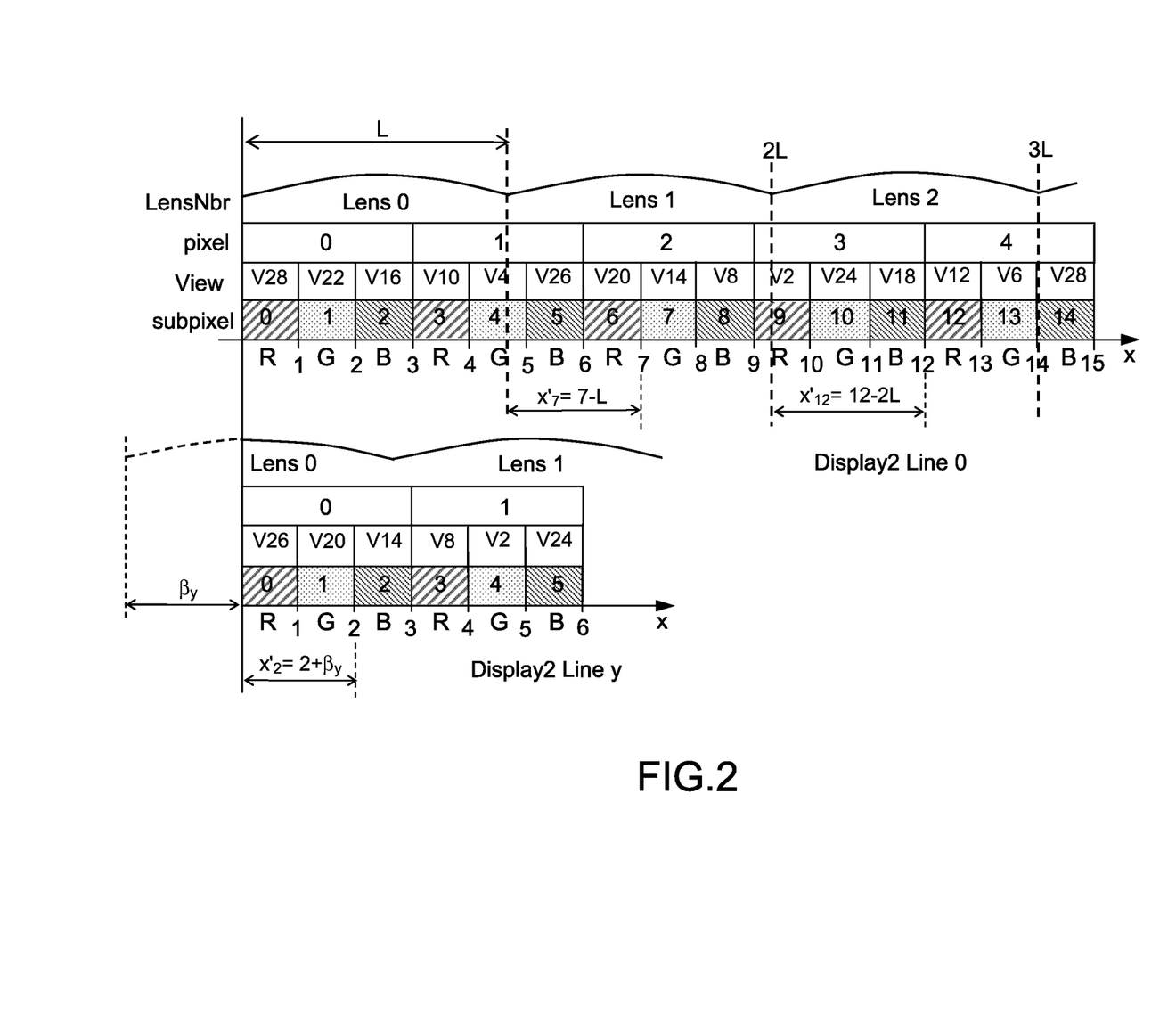
FIG. 2 presents a scheme of multi-view auto-stereoscopic display device generating 28 views.

FIG. 2 presents a scheme of a multi-view auto-stereoscopic display device referenced Display2, generating/delivering 28 views.

With the same representation as the one in FIG. 1, the following figure presents another multi-view auto-stereoscopic display device Display 2. For this display, the width of the lenses is not a multiple of the sub-pixel width, and the slope of the network does not correspond to a shift of one sub-pixel. For each sub-pixel at a horizontal position x and vertical position y, the position x' corresponding to its position relatively to the current lens can be expressed by the following relationship:

x'=modulo($x+\beta_y.L$) with $\beta_0=0$

Here, $\beta_y$ represents the phase between the sub-pixels and the lens for the line y. This phase depends on the slope of the lenticular network.

Figure 3:
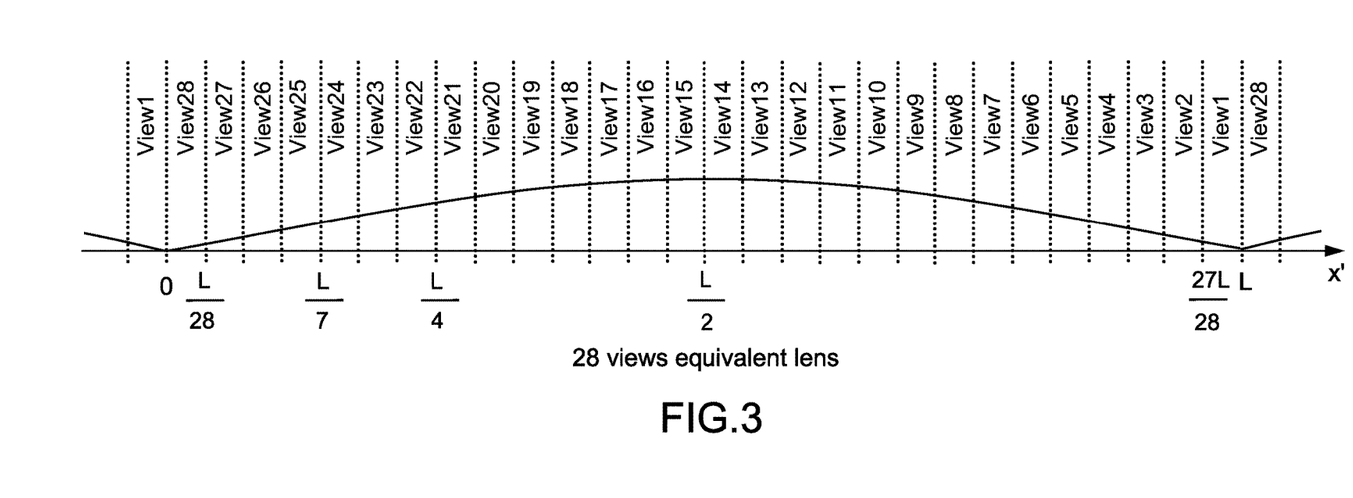
FIG. 3 presents a lens of the multi-view auto-stereoscopic display device of FIG. 2, and details how to choose the views to be associated to sub-pixels.

FIG. 3 presents a lens of the multi-view auto-stereoscopic display device of FIG. 2, and details how to choose the views to be associated to sub-pixels.

The manufacturer indicates that up to 28 auto-stereoscopic views can be provided by the display device of FIG. 2. In this case, the view to be provided to each sub-pixel depends on the value of x' in a space where the lens is split into 28 intervals. In this space, the view to be affected by this sub-pixel is given by:

$$\text{Subpixel}_{x,y} \leftarrow \text{view}_i \text{ when } \frac{(28-i)L}{28} \leq x' < \frac{(29-i)L}{28}$$

The relationship between the phase $\beta_y$ as presented on the FIG. 2 and the slope of the lenticular network is:

$$\beta_y = \frac{y}{\text{Slope}}$$

Nevertheless, this display device able to display up to 28 views can be addressed with only 8 views for example. In this case, the view to be affected to each sub-pixel is:

$$\text{Subpixel}_{x,y} \leftarrow \text{view}_i \text{ when } \frac{(8-i)L}{8} \leq x' < \frac{(9-i)L}{8}$$

Figure 4:
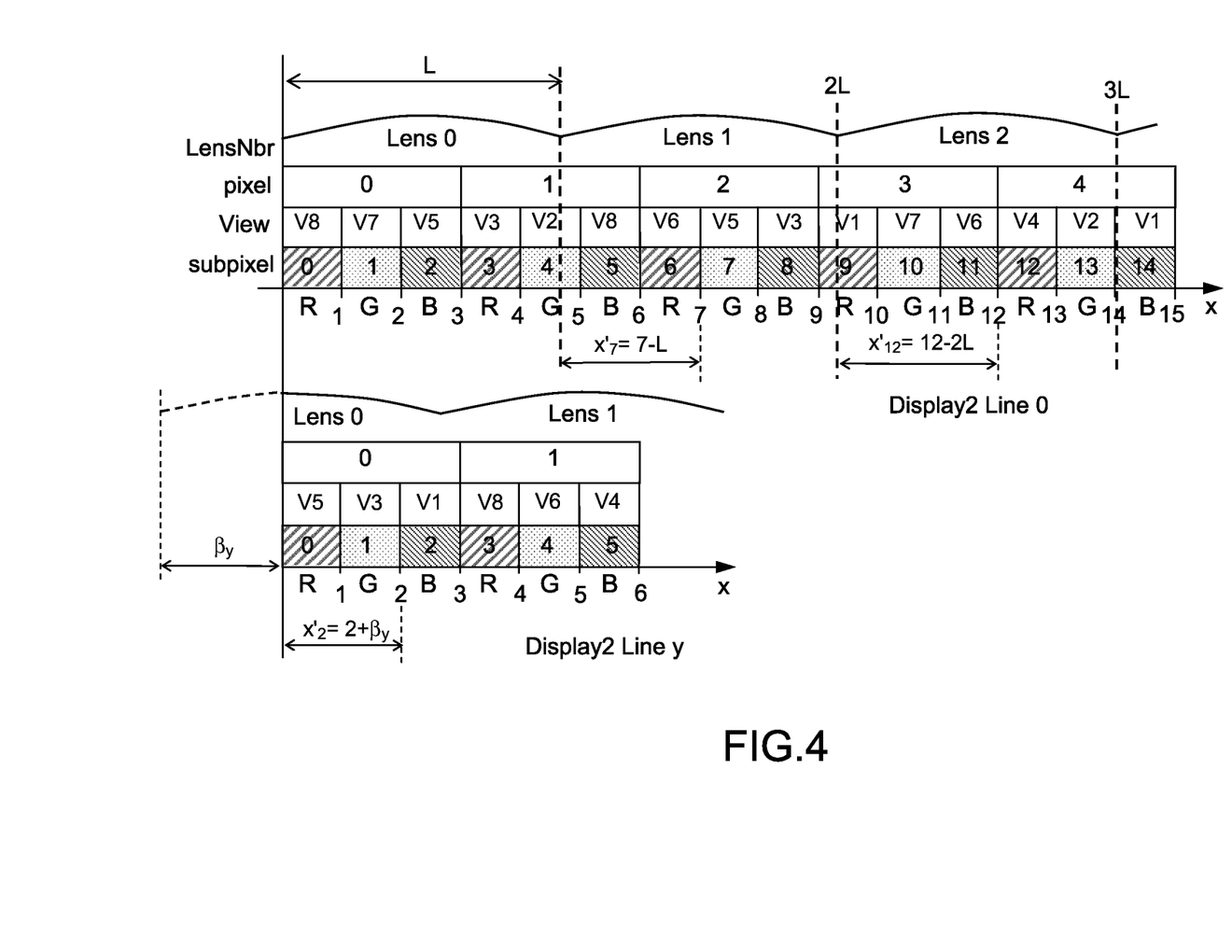
FIG. 4 presents a scheme of the multi-view auto-stereoscopic display device of FIG. 2 generating 8 views.
Figure 5:
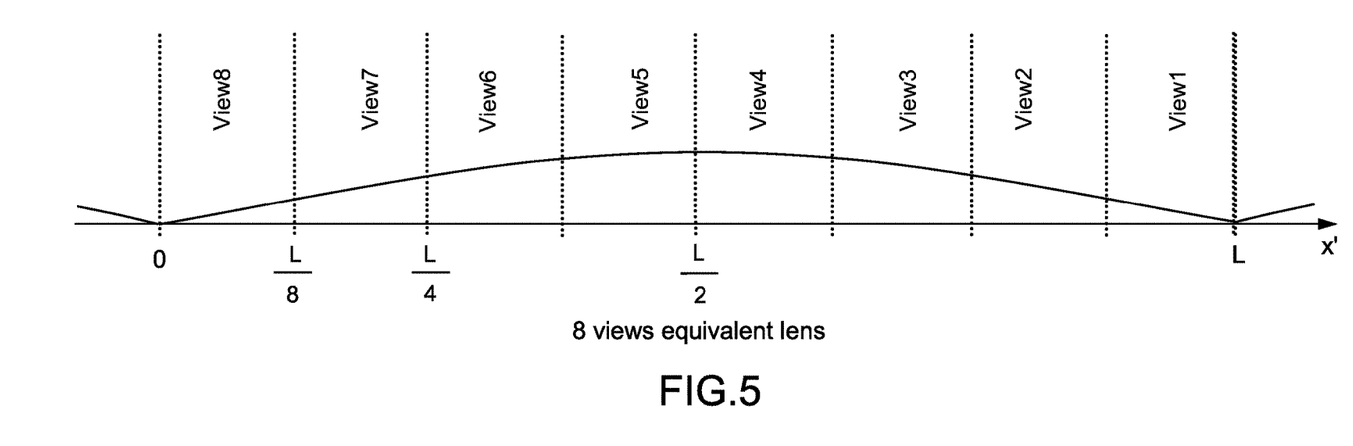
FIG. 5 presents a lens of the multi-view auto-stereoscopic display device of FIG. 4, and details how to choose the views to be associated to sub-pixels.

The FIG. 4 presents a scheme of the multi-view auto-stereoscopic display device of FIG. 2 generating 8 views, and the FIG. 5 presents a lens of the multi-view auto-stereoscopic display device of FIG. 4, and details how to choose the views to be associated to sub-pixels.

With these examples of auto-stereoscopic display devices (see FIGS. 1 and 2), we have seen that these devices support 8-view auto-stereoscopic content, but with completely different view mappings. Furthermore, while the device Display1 only supports 8 views, the device Display2 is compliant with 8 views but can be addressed with more than 8 views, up to 28 views. In this case, the mapping of the views is different as detailed in FIG. 2 and FIG. 4. It means that the number of views to be provided to the display device and the way these views are shuffled at a sub-pixel level depend on the display.

The renderer (or an electronic device associated with the renderer) has to perform two operations. If all the views to be displayed are available, the renderer has just to sub-sample these views to provide the correct one to each sub-pixel. But more frequently, all the views are not available and must be determined/computed by the renderer. This operation consists in projecting a disparity or depth map, then to synthesize a view. These operations are power consuming. Depending on its capabilities, the renderer may not perform these operations in real time, especially when the number of views to be displayed is high. It means that the number of views also depends on the renderer's capabilities.

Currently for auto-stereoscopic 3D, the renderer is dedicated to a display device, and is usually built in the device, like a TV receiving a standard signal and computing its own internal processing to adapt the content to its display technology and resolution.

If the rendering is performed outside the device, the renderer has to know which auto-stereoscopic device is connected and must have the appropriate algorithm to provide the correct view for each sub-pixel.

The present disclosure proposes a handshake mechanism between the display device and the renderer. In a first step, the number of views to be rendered and displayed (it should be noted that the number of views to be rendered and the number of views to be displayed are not always the same) is determined depending on the respective capabilities of the display device and the renderer. Then in a second step, a transfer of the mapping of the views at the sub-pixel level from the display to the renderer is ensured.

Using this mechanism, the system composed of the auto-stereoscopic display device and an external render is a "plug and play" system. The number of views depends on the capabilities of both devices; the handshake mechanism ensures the system to determine this number. The renderer does not need to know in advance neither which display device is connected nor the algorithm required to generate the shuffling of the views. It gets this information through a communication system. The renderer is universal. It adapts itself to the multi-view display that it has to address.

Figure 6:
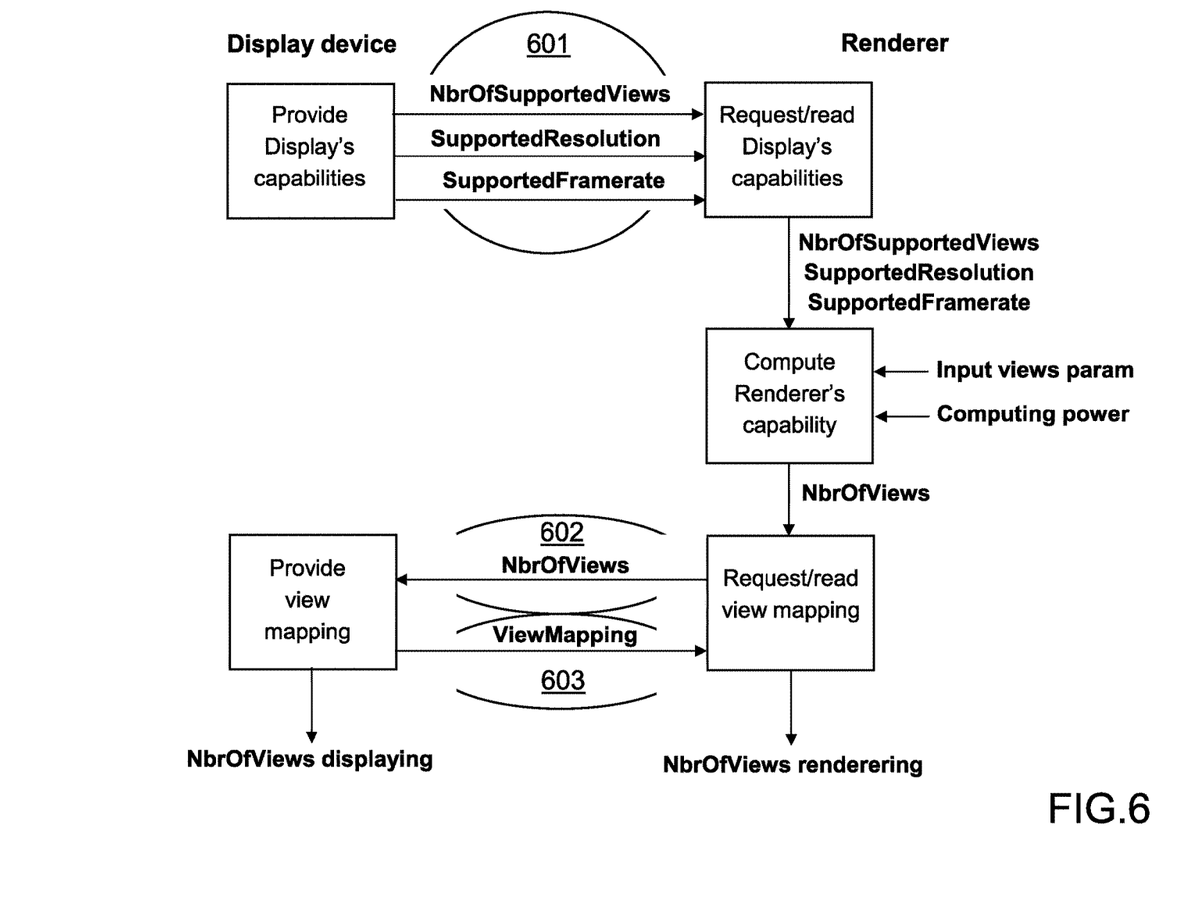
FIG. 6 presents a method for adapting a number of views delivered by an auto-stereoscopic display device, according to one embodiment of the present principles.

FIG. 6 presents a method for adapting a number of views delivered by an auto-stereoscopic display device, according to one embodiment of the present principles.

Indeed, in such embodiment, the auto-stereoscopic display device (also named in the following the display device) provides, in a step referenced 601, three parameters to the renderer: the supported frame rate, the supported resolution, and the supported number of views. It should be noted that in one embodiment of the present principles only the supported number of views (which can be, in another embodiment, the maximal number of views supported by said auto-stereoscopic display device) is transmitted to the renderer. The supported number of views can be either furnished in a list of supported views, or furnished one by one. In another embodiment of the present principles, a list of supported frame rates is provided to the renderer.

In one embodiment, the processing power required to generate the auto-stereoscopic content is determined based on the three previously mentioned parameters. Depending on its own computing power (and/or based on input from a user), the renderer determines the adequate number of views to be provided to the display device (such adequate number of views is noted NbrOfViews). In one embodiment, the adequate number of views and a frame rate from the list of supported frame rates are selected according to said processing power. Since the number of views to be synthesized depends on the number and the position of the input views, these parameters can be considered too. The worst case is when NbrOfViews views have to be synthesized. In one embodiment of the present principles, the user can, either via a configuration file (provided to the renderer via a USB key for example) or a graphical user interface, deliver a selection of parameters (between the three previously mentioned parameters for example), or information that defines how to combine previously mentioned parameters.

For example, in the case that the content to be visualize on the auto-stereoscopic display device is a sport program, the user could consider the frame rate parameter as the preferred parameter in the determination of the value of NbrOfViews (which is an adequate number of views as already mentioned previously). In the case that the user is more interested in having a high resolution content, the value of NbrOfViews can be the smaller one in the list of supported views (in order to implement for example the technique described in the article: "*Super Resolution for multiview images using depth information*", by Diogo C. Garcia et al., or the technique described in the article: "*Super-Resolution Stereo and Multi-View Synthesis from Monocular Video Sequences*" by Sebastian Knorr et al.). One skilled in the art could envision several combinations of the parameters obtained by the renderer depending on the expected goal of the user. It should also be noted that the renderer can also be configured in such way that the value of NbrOfViews can be modified regularly in the time, based on some criteria (such as a computation overload (due to the need to deliver several content to several auto-stereoscopic devices), or the release of some resources). Hence, the evolution of some parameters can be tracked over the time, and according modifications should be envisioned.

Then, in a step referenced 602, the renderer requests to the display device the mapping of the views for NbrOfViews views (such mapping is a correspondence map between sub-pixels of the auto-stereoscopic display device and the number of views NbrOfViews), and this information is sent by the display in a step referenced 603.

In another embodiment of the present principles, the renderer requests only a correspondence map between a set of sub-pixels of the auto-stereoscopic display device and the maximal number of views. Then, the renderer determines by taking into account its capacities a value for NbrOfViews. In that embodiment, the following property should hold: the maximal number of views is a multiple of said NbrOfViews. In that case, the renderer addresses the sub-pixels according to the correspondence map, by taking into account this property. For example, if the maximal number of views is equal to 32, then, in the case that the renderer determines a value of 4 for NbrOfViews, then, the renderer is going to address the correspondence map defined for 32 views with only 4 views.

Figure 7:
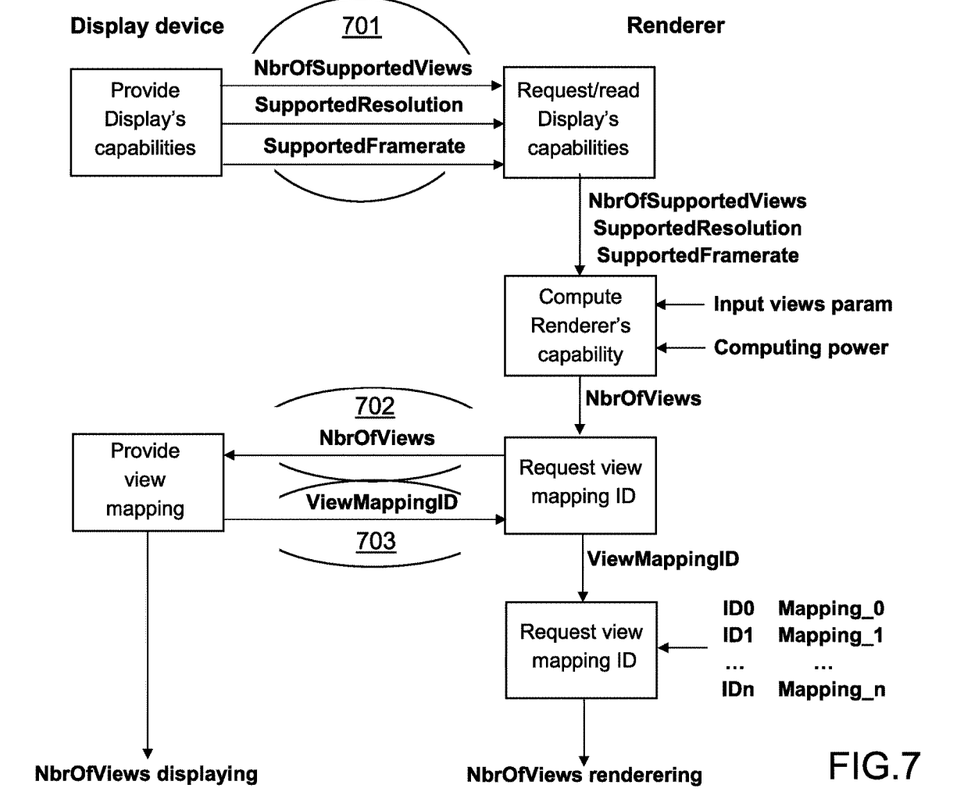
FIG. 7 presents a method for adapting a number of views delivered by an auto-stereoscopic display device, according to another embodiment of the present principles.

FIG. 7 presents a method for adapting a number of views delivered by an auto-stereoscopic display device, according to another embodiment of the present principles.

If the speed of the communication means and the amount of data does not allow a transfer of the mapping of the views (i.e. the correspondence maps), the mappings can be already available at the renderer side, provided for instance as a driver with the display device (in this embodiment, the steps referenced 701 and 702 are respectively the same as the steps 601 and 602. However, the steps 603 is replaces by a step referenced 703 which comprises the obtaining (by the renderer) of an identifying element from the display device). Indeed, these mappings (or correspondence maps) are identified by a unique identification number (representing the shuffling of the views for this device, displaying this NbrOfViews). The mappings could be provided with the display device as tables, or as a piece of code that can determine a correspondence map depending on the number of views. This piece of code generating the mapping of the views is highly dependent on the display device. The algorithm associated to said piece of code that is used to generate this mapping is dedicated to the auto-stereoscopic display device and requires specific information related to its internal structure, in term of sub-pixels and lens relative positions. Such specific information is a set of features linked to the auto-stereoscopic display device. In one embodiment, even if this code is executed on the rendering device, it is provided by the manufacturer of the auto-stereoscopic display device. In this case, the rendering software/hardware has only to generate the required number of views to be displayed, independently of the view mapping, and to exploit the view mapping provided by the display manufacturer's software to perform the view shuffling. The rendering software/hardware is totally independent of the display.

Figure 8:
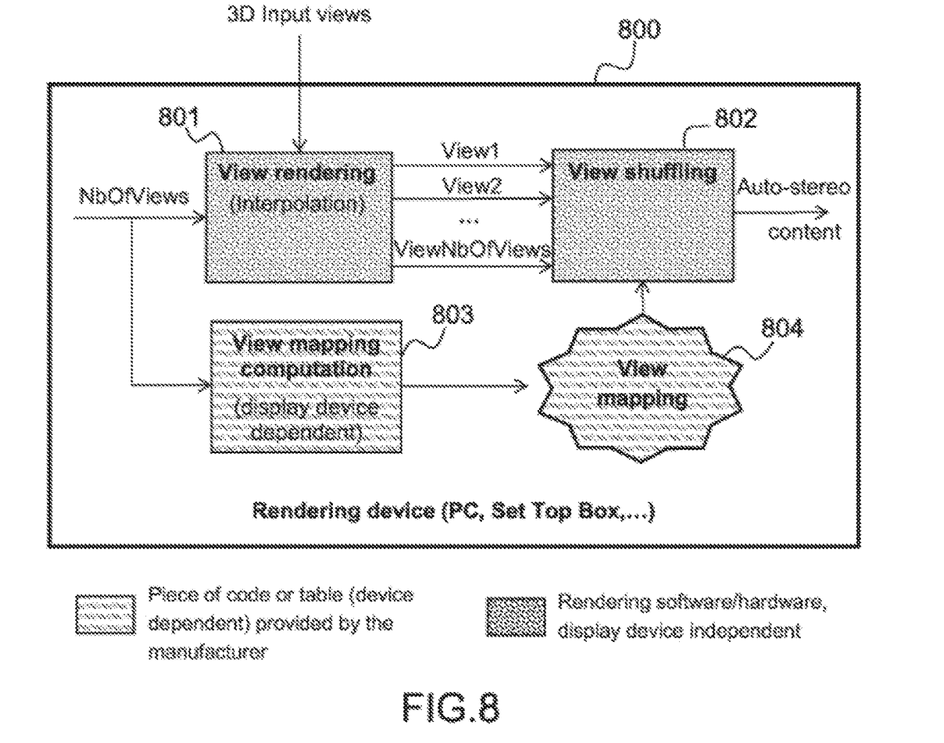
FIG. 8 presents an example of internal architecture of a renderer according to one embodiment of the present principles.

FIG. 8 illustrates an exemplary architecture of a renderer according to an embodiment of the present principles. The renderer module referenced 800 can generate, for a defined value of NbrOfViews (obtained from inputs parameters and a 3D input (that can be for example stereoscopic views, with a disparity map)), corresponding images views via a view rendering module referenced 801. These image views are then delivered to a view shuffling module referenced 802 that also takes as input a view mapping (or correspondence map). Then, the view shuffling module 802 addresses the sub-pixels with an image view according to the view mapping. It should be noted that in one embodiment of the present principles, the view mapping is generated/determined by a view mapping computing module referenced 803. The result is provided to a view mapping module referenced 804 that provides to the view shuffling module 802 a view mapping.

It should be noted that the mapping corresponding to the display device and the NbrOfViews views could be loaded dynamically using this identification number that is associated with a correspondence map.

Figure 9:
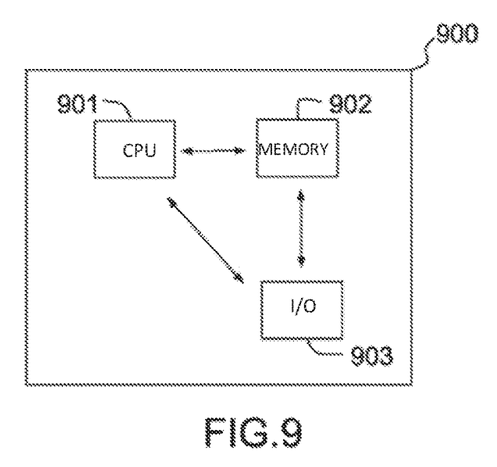
FIG. 9 presents an example of an electronic device that can be used to perform one or more steps of methods disclosed in the present document.

FIG. 9 presents an example of an electronic device that can be used to perform one or more steps of methods disclosed in the present document.

Such device referenced 900 comprises a computing unit (for example a CPU, for "Central Processing Unit"), referenced 901, and one or several memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 902. Computer programs are made of instructions that can be executed by the computing unit. Such device 900 can also comprise a dedicated unit, referenced 903, constituting an input-output interface to allow the device 900 to communicate with other devices. In particular, this dedicated unit 903 can be connected with an antenna (in order to perform communication without contacts), or with serial ports (to carry communications by the means of "physical contacts"). It should be noted that the arrows in FIG. 9 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 9.

The invention claimed is:

1. A method for adapting a number of views delivered by an auto-stereoscopic display device having sub-pixels, said method being executed by an electronic device, and comprising:
    determining a number of views based on information related to said auto-stereoscopic display device and a handshake mechanism with said auto-stereoscopic display device, said information comprising: 1) a list of number of views supported by said auto-stereoscopic display device and 2) at least an information indicative of a computing power of a device needed to deliver content for each view, wherein said list of number of views comprises at least two different number of views;
    obtaining a correspondence map between said sub-pixels of said auto-stereoscopic display device and said number of views; and
    providing content to said sub-pixels of said auto-stereoscopic display device according to said correspondence map to adapt said number of views delivered by said auto-stereoscopic display device having said sub-pixels.

2. The method according to claim 1, wherein said determining further uses information indicative of a resolution of said auto-stereoscopic display device.

3. The method according to claim 1, wherein said determining further uses information derived from a list of frame rates supported by said auto-stereoscopic display device.

4. The method according to claim 1, wherein said determining further uses information provided by a user, and/or information related to a program which is associated with said content.

5. The method according to claim 1, wherein determining a number of views is done regularly during a time slot.

6. The method according to claim 1, wherein said obtaining a correspondence map comprises obtaining an identifying element associated with said correspondence map.

7. The method according to claim 1, wherein said obtaining a correspondence map comprises executing a piece of code comprising a set of features linked to said auto-stereoscopic display device.

8. A computer and non-transient storage medium storing a computer program comprising a set of computer-executable instructions to implement a method for adapting a number of views delivered by an auto-stereoscopic display device having sub-pixels when the instructions are executed by a computer, wherein the instructions comprise instructions, which when executed, configure the computer to perform a method for adapting a number of views delivered by an auto-stereoscopic display device, said method comprising:
    determining a number of views based on information related to said auto-stereoscopic display device and a handshake mechanism with said auto-stereoscopic display device, said information comprising: 1) a list of number of views supported by said auto-stereoscopic display device and 2) at least an information indicative of a computing power of a device needed to deliver content for each view, wherein said list of number of views comprises at least two different number of views;
    obtaining a correspondence map between said sub-pixels of said auto-stereoscopic display device and said number of views; and
    providing content to said sub-pixels of said auto-stereoscopic display device according to said correspondence map to adapt said number of views delivered by said auto-stereoscopic display device having said sub-pixels.

9. An electronic device for adapting a number of views delivered by an auto-stereoscopic display device having sub-pixels, wherein it comprises:
    a first module configured to determine a number of views based on information related to said auto-stereoscopic display device and a handshake mechanism with said auto-stereoscopic display device, said information comprising: 1) a list of number of views supported by said auto-stereoscopic display device and 2)at least an information indicative of a computing power of a device needed to deliver content for each view, wherein said list of number of views comprises at least two different number of views;

a second module configured to obtain a correspondence map between said sub-pixels of said auto-stereoscopic display device and said number of views; and a third module configured to provide content to said sub-pixels of said auto-stereoscopic display device according to said correspondence map to adapt said number of views delivered by said auto-stereoscopic display device having said sub-pixels.

10. The electronic device according to claim 9, wherein said first module configured to determine further uses information indicative of a resolution of said auto-stereoscopic display device.

11. The electronic device according to claim 9, wherein said first module configured to determine further uses information derived from a list of frame rates supported by said auto-stereoscopic display device.

12. The electronic device according to claim 9, wherein said first module configured to determine further uses information provided by a user, and/or information related to a program which is associated with said content.

13. The electronic device according to claim 9, wherein said first module configured to determine a number of views is activated regularly during a time slot.

14. The electronic device according to claim 9, wherein said second module configured to obtain a correspondence map uses an identifying element associated with said correspondence map.

15. The electronic device according to claim 9, wherein said second module is further configured to execute a piece of code comprising a set of features linked to said auto-stereoscopic display device.

* * * * *